United States Patent
Parekh et al.

(10) Patent No.: US 9,952,591 B2
(45) Date of Patent: Apr. 24, 2018

(54) SPATIAL-TEMPORAL FORECASTING FOR PREDICTIVE SITUATIONAL AWARENESS

(71) Applicants: Devang R. Parekh, San Diego, CA (US); Henry H. Fung, San Diego, CA (US); Feng Cao, San Diego, CA (US); Louis Oddo, Carlsbad, CA (US); Miteshkumar K. Patel, San Marcos, CA (US); William Parsons, Valley Center, CA (US)

(72) Inventors: Devang R. Parekh, San Diego, CA (US); Henry H. Fung, San Diego, CA (US); Feng Cao, San Diego, CA (US); Louis Oddo, Carlsbad, CA (US); Miteshkumar K. Patel, San Marcos, CA (US); William Parsons, Valley Center, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 237 days.

(21) Appl. No.: 14/951,212

(22) Filed: Nov. 24, 2015

(65) Prior Publication Data
US 2017/0146991 A1    May 25, 2017

(51) Int. Cl.
G05D 1/00    (2006.01)
B64D 45/00   (2006.01)
G05D 1/02    (2006.01)

(52) U.S. Cl.
CPC .......... *G05D 1/0016* (2013.01); *B64D 45/00* (2013.01); *G05D 1/021* (2013.01); *G05D 1/0202* (2013.01); *B64C 2201/12* (2013.01); *B64C 2201/146* (2013.01)

(58) Field of Classification Search
CPC .... G05D 1/0016; G05D 1/0202; G05D 1/021; B64C 2201/12; B64C 2201/146; B64D 45/00
See application file for complete search history.

(56) References Cited

U.S. PATENT DOCUMENTS

| 6,415,227 | B1 | 7/2002 | Lin |
| 6,622,090 | B2 | 9/2003 | Lin |
| 7,143,130 | B2 | 11/2006 | Lin |
| 8,068,949 | B2 | 11/2011 | Duggan et al. |

(Continued)

OTHER PUBLICATIONS

Kilgore, Ryan M., et al. "Mission planning and monitoring for heterogeneous unmanned vehicle teams: A human-centered perspective." *AIAA Infotech@ Aerospace Conference in Sonoma, CA*. 2007.

(Continued)

*Primary Examiner* — Mussa A Shaawat
(74) *Attorney, Agent, or Firm* — Tarolli, Sundheim, Covell & Tummino LLP

(57) ABSTRACT

An interface includes a human machine interface (HMI) to provide a visualization of current and future states of a mission associated with one or more unmanned vehicles. A time specifier provides input to the HMI to specify a current time or a future time for the visualization of the current and future states of the mission. A prediction engine generates predictions of the current and future states of the mission for the visualization based on the current time or the future time specified by the time specifier.

20 Claims, 6 Drawing Sheets

(56) References Cited

U.S. PATENT DOCUMENTS

| | | | |
|---|---|---|---|
| 8,195,343 B2 | 6/2012 | Lin | |
| 8,229,163 B2 | 7/2012 | Coleman et al. | |
| 8,918,280 B1 | 12/2014 | Heinrich | |
| 2006/0114324 A1* | 6/2006 | Farmer | G01S 7/003 348/144 |
| 2007/0021880 A1* | 1/2007 | Appleby | G05D 1/0088 701/23 |
| 2007/0168090 A1* | 7/2007 | DeMarco | G05D 1/104 701/23 |
| 2008/0062167 A1* | 3/2008 | Boggs | G06F 17/5004 345/419 |
| 2008/0243317 A1* | 10/2008 | Morales De La Rica | G05D 1/101 701/11 |
| 2011/0309143 A1* | 12/2011 | Wood | G08G 5/00 235/400 |
| 2016/0069994 A1* | 3/2016 | Allen | G01S 13/9303 342/29 |
| 2016/0240091 A1* | 8/2016 | Thiele | G08G 5/045 |
| 2016/0252902 A1* | 9/2016 | Rodas | G05D 1/0027 701/2 |
| 2016/0343093 A1* | 11/2016 | Riland | G06Q 10/04 |
| 2017/0018184 A1* | 1/2017 | Northrup | G08G 1/144 |
| 2017/0032263 A1* | 2/2017 | Yuan | G06N 5/045 |
| 2017/0061813 A1* | 3/2017 | Tao | G09B 9/08 |
| 2017/0110018 A1* | 4/2017 | Wang | G08G 5/0078 |
| 2017/0178352 A1* | 6/2017 | Harmsen | G06T 7/579 |

OTHER PUBLICATIONS

Cummings, Mary L., et al. *Automation architecture for single operator, multiple UAV command and control.* Massachusetts Inst of Tech Cambridge, 2007.

Ho, Geoffrey, Nada Pavlovic, and Robert Arrabito. "Human factors issues with operating unmanned underwater vehicles." *Proceedings of the Human Factors and Ergonomics Society Annual Meeting.* vol. 55. No. 1. Sage Publications, 2011.

Albus, James, et al. "4d/rcs: A reference model architecture for unmanned vehicle systems version 2.0." (2002).

Tang, Liang, et al. "A testbed for real-time autonomous vehicle PHM and contingency management applications." *Annual conference of the prognostics and health management society.* 2011.

Gimenes, Ricardo, et al. "Using Flight Simulation Environments with Agent-Controlled UAVs." *Autonomous Robot Systems and Competitions: Proceedings of the 8th Conference.* 2008.

Cicibas, H., et al. "A Simulation Model for Analysing Unmanned Aerial Vehicle Flight Paths." *Proceedings of the 24th European Modeling and Simulation Symposium (EMSS), Vienna, Austria.* 2012.

Papp, Zita. *Mission Planner for Heating-Optimal Re-Entry Trajectories with Extended Range Capability.* Diss. TU Delft, Delft University of Technology, 2014.

Albus, James S. "4D/RCS: a reference model architecture for intelligent unmanned ground vehicles." *AeroSense 2002.* International Society for Optics and Photonics, 2002.

* cited by examiner

SPATIAL-TEMPORAL FORECASTING FOR PREDICTIVE SITUATIONAL AWARENESS

TECHNICAL FIELD

This disclosure relates to unmanned vehicle interfaces, and more particularly to an interface, system, and method to provide spatial and temporal forecasting for predictive situation awareness of unmanned vehicles.

BACKGROUND

Typical mission plan interface software for a general unmanned vehicle (UxV) allows operators to control the UxVs via a graphical user interface that includes various input and output options for feedback and control of the UxV mission. The graphical user interface typically provides a three-dimensional presentation that includes latitude, longitude, and altitude information in the display output relating to a proposed plan of the UxV. The software also allows monitoring current missions in progress. This includes updating way points, aborting plans, allowing manual override, and so forth. The graphical user interface must satisfy several requirements such as being user-friendly, allowing three-dimensional mission planning, allowing upload of the plan to the UxV, and allowing manual override based on operator input. The graphical user interface can be split into several sections that convey different information to the operator that in some cases can be adjusted. For instance, a plan control section shows UxV component status, manual override status, and readings from on-board instruments. During a mission, the UxV reports on data relevant to its position, attitude, and heading, for example. This data can be presented to the operator via the interface using an instrument panel display and coordinate mapping system, for example. One issue with current UxV interface software is that new plans or alternative options to existing plans are developed and evaluated off line and uploaded to the UxV after review and approval. After loading, it may be determined that the UxV could no longer carry out the proposed plan due to the delay in the development of an alternative option and its subsequent evaluation.

SUMMARY

This disclosure relates to spatial and temporal forecasting for predictive situation awareness of unmanned vehicles (UxVs). In one aspect, a system includes one or more computers executing computer executable components. The computer executable components include a state aggregator that aggregates mission plan inputs and data feeds to generate a current world state output for at least one unmanned vehicle (UxV) mission. The current world state output describes the current state of the mission plan inputs and the data feeds. The mission plan inputs describes current mission destinations and tasks to be executed by the UxV and the data feeds describe current detected events that affect the current world state of the UxV mission. A time specifier generates a command to specify a time window to execute the current UxV mission. A prediction engine receives the current world state output of the UxV mission from the state aggregator and generates a future world state projection for the mission plan inputs and the data feeds to predict a future time projection of the UxV mission based on a future time specified by the time specifier command. A human machine interface (HMI) generates a visualization of the UxV mission. The HMI generates a future world state visualization for the UxV mission based on the future world state projection from the prediction engine if the future time is specified by the time specifier command.

In another aspect, a computer readable medium having computer executable instructions stored thereon is provided. The computer executable instructions are configured to aggregate mission plan inputs and data feeds to generate a current world state output for at least one unmanned vehicle (UxV) mission. The current world state output describes the current state of the mission plan inputs and the data feeds. The mission plan inputs describes current mission destinations and tasks to be executed by the UxV and the data feeds describe current detected events that affect the current world state of the UxV mission. The instructions are configured to process a specified time window to execute the current UxV mission. The instructions are configured to receive the current world state output of the UxV mission and generate a future world state projection for the mission plan inputs and the data feeds to predict a future time projection of the UxV mission based on a future time specified. The instructions are configured to generate a future world state visualization for the UxV mission based on the future world state projection if the future time is specified.

In yet another aspect, a method includes aggregating mission plan inputs and data feeds to generate a current world state output for at least one unmanned vehicle (UxV) mission. The current world state output describes the current state of the mission plan inputs and the data feeds. The mission plan inputs describes current mission destinations and tasks to be executed by the UxV and the data feeds describe current detected events that affect the current world state of the UxV mission. The method includes processing a specified time window to execute the current UxV mission. The method includes generating a future world state projection for the mission plan inputs and the data feeds to predict a future time projection of the UxV mission based on a future time specified. The method includes generating a future world state visualization for the UxV mission based on the future world state projection if the future time is specified.

DETAILED DESCRIPTION

Figure 1:
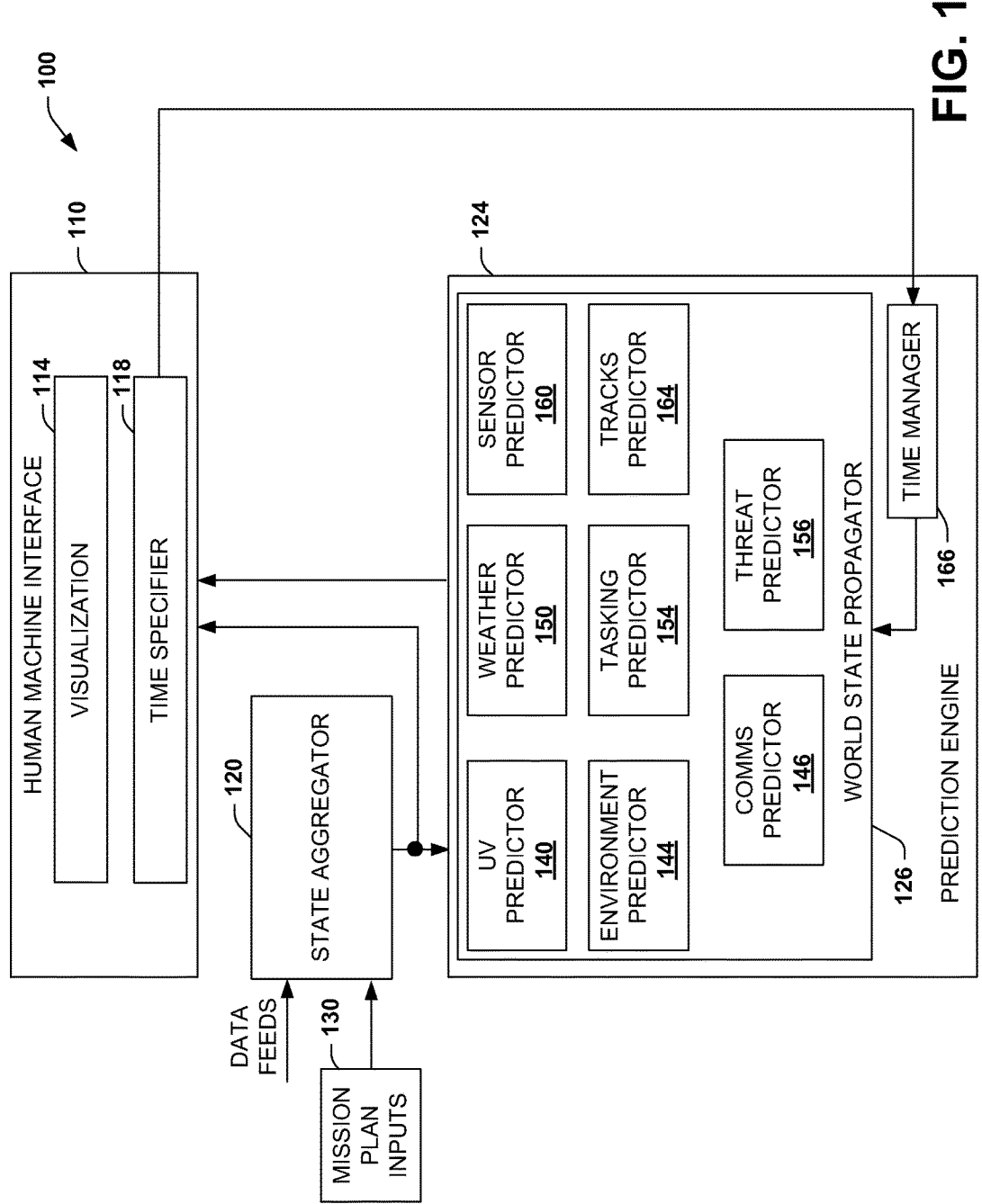
FIG. 1 illustrates a block diagram of an example system to provide spatial and temporal forecasting for predictive situation awareness of unmanned vehicles (UxVs).

This disclosure relates to spatial and temporal forecasting for predictive situation awareness of an unmanned vehicle.

A system, method, and interface provides operators a 4D (3D spatial coordinates and time) holistic and integrated user experience that allows unmanned vehicle operators to conduct and visualize mission scenarios in the future. The interface provides operators a situation awareness (SA) capability allowing them to "observe into the future" to better understand what has happened, what is happening, what is planned to happen, and what could happen to one or more unmanned vehicles given future plan options. The interface output can be observed in current time and projected into future time to determine if possible future missions are viable. This allows operators to more effectively plan their resources and maximize the probability of mission success. Projection capability can be provided online and in real-time without disrupting current mission operations.

A human machine interface (HMI) provides an output visualization of current and future states of a mission for at least one unmanned vehicle. The HMI can also visualize swarms of UxVs of disparate types as well as manned platforms and teams of Manned and Unmanned (MUMT) systems. This enables control and analysis of swarms of disparate assets from a single HMI. A time specifier provides command input to the HMI to specify a current time or a future time for the visualization of the current and future states of the mission. The time specifier can be controlled from substantially any operator input such as a time slider operated from a mouse, voice command, a hand or finger gesture, or a retinal scan command, for example. A state aggregator receives data feeds from one or more inputs to determine a current world state of the mission. The data feeds can be collected from source inputs such as weather inputs, threat detection devices, sensors, communications modules, and so forth. A prediction engine employs the current world state of the mission determined by the state aggregator and generates predictions of the current and future states of the mission for the visualization based on the current time or the future time specified by the time specifier. For example, if present time is specified, current real time operations and status for an unmanned vehicle or swarm, consisting of heterogeneous unmanned platforms, can be displayed. If the time specifier specifies a future time, then the real time current environment can be projected into the future to allow the operator to analyze alternative scenarios that may occur in the future.

To help operators make better decisions in the face of uncertainty, probabilistic or heuristic algorithms can provide real-time projected future simulations and analysis that yield a quantifiable and acceptably narrow error bounds on the projected states for the mission. For example, if a task has a hypothetical +/−10 minute time window for execution, it can be shown to the operator via simulations and analysis in the visualization that a plan for that task can be executed within the specified time window.

While specific examples in this disclosure are focused on Unmanned Aerial Vehicles (UAV's) the technical approaches in this disclosure can be applied to other unmanned domains including space borne, sea surface, sea subsurface, and ground (collectively referred to as UxV's) without loss of generality. In addition, the examples in this disclosure may also be applied to manned platforms as well as Manned and Unmanned Teaming (MUMT) consisting of multiple UxVs of disparate types.

FIG. 1 illustrates a block diagram of an example system 100 to provide spatial and temporal forecasting for predictive situation awareness of an unmanned vehicle. As used herein, the term unmanned vehicles can include unmanned ground vehicles (UGV), unmanned underwater vehicles (UUV), unmanned surface vehicles (USV), and unmanned aerial vehicles (UAV). The system 100 includes a human machine interface (HMI) 110 to provide an output visualization 114 of current and future states of a mission for at least one unmanned vehicle. A time specifier 118 provides command input to the HMI 110 to specify a current time or a future time for the visualization 114 of the current and future states of the mission. A state aggregator 120 receives data feeds from one or more inputs to determine a current world state of the mission (e.g., present state). A prediction engine 124 employs the current world state of the mission determined by the state aggregator 120 to generate predictions of the current and future states of the mission for the visualization 114 based on the current time or the future time specified by the time specifier 118. A world state propagator 126 from the prediction engine 124 outputs the projected future state of the data feeds and/or mission plan 130 from the state aggregator 130 based on a future time specified by the time specifier 118.

The time specifier 118 can specify future or current times for the visualization 114 from various interface input sources. For example, such sources can include a time slider graphical input to specify the current time or the future time for the visualization 114, a voice input to specify the current time or the future time, a hand or finger gesture to specify the current time or future time, or a retinal scan input to specify the current time or the future time. The data feeds (See e.g., FIG. 2) can include at least one of a mission plan input (or inputs) 130 to provide primary and contingency route information for the unmanned vehicle, a tasking input to describe actions to perform, and a weather input to provide information relating to current and future weather patterns, for example. The data feeds can also include at least one of a threat input to provide threat information relating to external threats to the unmanned vehicle, a track input to relating to the type of entity encountered by the unmanned vehicle, a sensor input to provide data collected by the unmanned vehicle, and/or a communications input to provide information regarding the type of communications assets that are available to the unmanned vehicle.

The prediction engine 124 can include at least one model to generate predictions for future states of the data feeds received by the state aggregator 120 of the unmanned vehicle. The models can include an unmanned vehicle predictor 140 to predict future positions and onboard system states of the unmanned vehicle, an environment predictor 144 to predict future environment conditions for the unmanned vehicle (e.g., temperature, pressure, visibility), and a communications predictor 146 to predict the state of communications assets that are available in the future. The models can include a weather predictor 150 to predict future weather states to be encountered by the unmanned vehicle, a tasking predictor 154 to predict the future state of a target task along with the actions that can be performed in the future by the unmanned vehicle, and a threat predictor 156 to predict the future states of detected threats to the unmanned vehicle. The environment can consist of a collection of predictor models that impact the environment. For example, the weather predictor 150 generates predictions for winds, icing, temperature, pressure, visibility and so forth. The threat predictor 156 generates probability of detection, for example. The Environment consists of a collection of predictor models that affect the environment. The models can also include a sensor predictor 160 to predict the sensor footprints, fields of regard, and ranges that are available to the unmanned vehicle in the future and a tracks predictor 164 to predict the future position and trajectories of entities that have been encountered in the environment. The tracks predictor 164 generates air space tracks that consists of blue force, red force, or unknown tracks, for example. The tracks predictor 164 can also determine other entities in air, ground, and space integration (e.g., blue force, red force, land/ground), terrain predictor (mountains), and so forth.

As will be illustrated and described below, the prediction engine 124 can also include a time manager 166 to generate a future time for model predictions based on detecting a change in the time specifier 118. As noted previously, the prediction engine 124 can include the world state propagator 126 that generates the predicted future state for the data feeds and/or mission plan inputs 130 received from the state aggregator 120. The prediction engine 124 can also include a world state predictor (See e.g., FIG. 2) that predicts a future state of a visualization for the unmanned vehicle based on the predicted future states for the data feeds from the world state propagator and the future time generated by the time manager 166. The HMI 110 can also include a world state rendering pipeline (See e.g., FIG. 2) to generate the future visualization for the HMI based on the future state prediction from the world state predictor. The visualization of the future state of the mission can display a future environment to be encountered by the unmanned vehicle (or vehicles) or can display alternative flights paths of the unmanned vehicle (See e.g., FIGS. 4-7), for example.

There are multiple elements in unmanned vehicle operations that vary over time requiring real-time decisions to be made that trade-off various "what if" scenario options over a critical future time period. The time specifier 118 and prediction capabilities of the system 100 allow for analysis of a plurality of various future mission states over time periods selected by the operator. Examples may include a unit level UAV operator in the middle of executing a long endurance mission. A high priority task is received from the commander requesting that a new time critical action is added to the mission in the near future. An operator in this situation can utilize the system 100 and interface 110 to look into the future and determine if the UAV can actually satisfy the time critical task, for example—can the UAV asset arrive in time. Another predictive visualization can include determining how much disruption will occur to the plan the UAV is currently executing if the operator takes on the new task—thus, how many planned tasks may now get dropped and not completed in order to execute the new task.

Other analysis provided by the system 100 can include determining task priorities such as determining if the priority of a new task is worth the loss of current the planned tasks by analyzing future visualizations 114. The respective tasks can be analyzed at some time in the future as specified by the time specifier 118 to determine both the present task and/or future task can be accommodated. This can include determining how to minimize disruption (minimize the loss of planned tasking) and what alternative plans could be executed. This future task analysis can also include how much tasking loss does each task minimize and along with determining which tasking plan is optimum.

A multi-agent, cooperative/swarming scenario can also be supported by the system 100. This includes the added complexity of managing multiple UAV's. This includes generating a 118 visualization to determine which UAV receives the assigned task. Also, this includes determining how the preplanned tasks are redistributed across the fleet of UAV's so as to minimize tasking loss. Some operational variables that can be visualized in the future include the forward-looking status for various flight status including fuel reserve and consumption, speed, altitude, target, and task priority. Other forward-looking status can include density or movement, temperature, mission variables/decision points, wind, precipitation, clouds, fog, smoke, and dust, for example. Still yet other projected status can include route and waypoint options, distance to available resources, distance to ground station, threats, nature of threats, jamming, maintenance concerns, bandwidth and so forth, for example.

Figure 2:
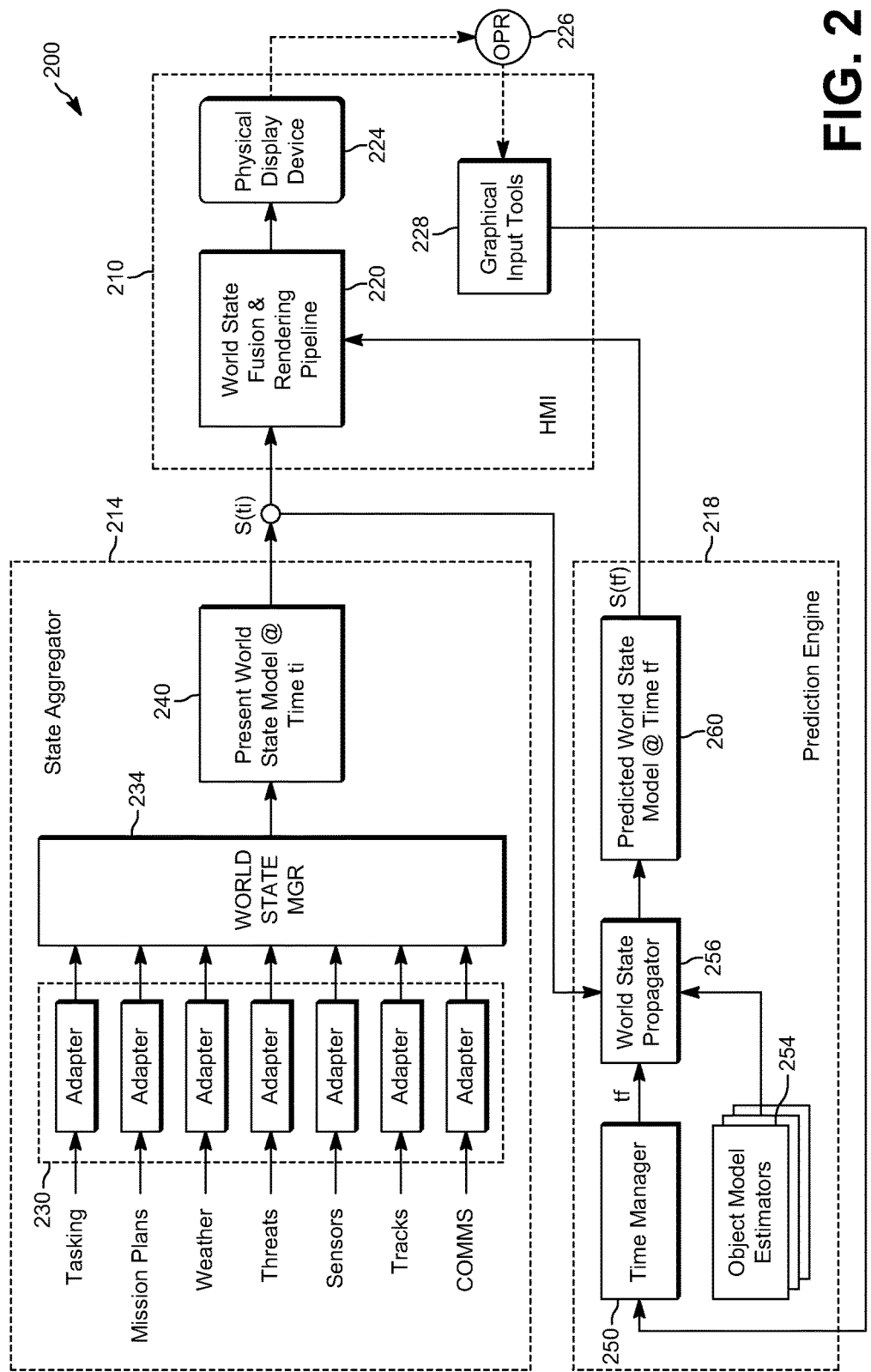
FIG. 2 illustrates a schematic diagram of an example system to provide spatial and temporal forecasting for predictive situation awareness of unmanned vehicles.

FIG. 2 illustrates a schematic diagram of an example system 200 to provide spatial and temporal forecasting for predictive situation awareness of an unmanned vehicle. The system 200 provides a more detailed aspect to the system 100 described above. The system 200 includes a human machine interface (HMI) 210, a state aggregator 214, and a prediction engine 218. The HMI 210 includes a world state rendering pipeline 220 to generate visualizations to an output device 224 that can be viewed by an operator 226. A graphical input 228 can be used by the operator to operate a time slider (See e.g., FIGS. 4-7) to specify current or future times for visualization renderings at the display 224.

The state aggregator 214 receives and processes the various data feeds that constitute a mission. It is generally always on and is processing in real time. It provides the current world state to the HMI 210 and the prediction engine 218. The HMI 210 provides situational awareness in real time of the current world state and can provide fused visualizations of the current world state and alternative future world states. The HMI 210 also includes graphical tools 228 to allow an operator to control the prediction engine 218 enabling the generation of alternative plans projected into the future. The prediction engine 218 has access to the current world state, alternative plans, and receives operator inputs to project the current world state and alternative plans to some point in the future. The prediction engine 218 provides the projected future world state and any projected alternatives to the HMI 210 for fusion and display to the operator 226.

The state aggregator 214 includes static and real-time data feeds that constitute a mission and are received via adapter modules 230 which are processed via world state manager 234. The data feeds can include a mission plan. This data feed originates from various mission planning engines in various formats, and includes the primary route and contingency routes for each platform. Furthermore, it includes the state of a platform (position, velocity, orientation, fuel, and so forth) at periodic increments. This is true for each unmanned vehicle platform along the primary route and contingency routes.

A tasking data feed originates external to the system in various formats and consists of actions to perform. These actions may include Intelligence Surveillance and Reconnaissance (ISR) collections, strike (both kinetic and electronic), communications relay, and the delivery of a payload such as fuel or supplies. Tasking can have constraints that may include a time window within which the action must take place; a location where the action must be performed; and detailed geometric constraints that may include azimuth, elevation, and velocity with respect to the tasking, for example. A weather data feed originates external to the system in various formats and consists of information pertaining to winds, currents, cloud coverage, temperature, humidity, and precipitation. Weather feeds include both current measurements and forecasted conditions.

A threats data feed originates external to the system in various formats and includes threat information (e.g., type of threat, location, and range of threat effectiveness). Threats may also include environmental obstacles such as terrain, bodies of water, icebergs, and cultural obstacles such as power lines, buildings, and towers. A tracks data feed originates external to the system in various formats and includes track information (e.g., entity type, hostile/friendly, location, velocity, orientation). A sensors data feed is per payload type for each asset and consists of data for field of view and field of regard data on position and orientation of the sensor. A COMMS data feed provides they type of communications asset available and its current and planned footprint over time.

Because each of the data feeds delineated above has multiple formats and can change in real-time, and independently of one another, adapters 230 have been created to mediate the various data types to an internal standardized data model managed by the world state manager 234. The world state manager 234 has the responsibility to aggregate the disparate data feeds into a single internal representation and at a single point in time as well as store and manage the internal data model. By extension, other inputs and data feeds may also be aggregated into the internal data model as needed through additional adapters 230.

At a particular time instance, t(i), the aggregation of all the data as captured constitutes the present world state 240. This present world state 240 is updated in real time and, at a minimum, is updated at a 1 Hz rate, for example. The present world state snapshot is made available to the HMI's fusion and rendering pipeline component 220 which automatically renders the state onto a physical display device for the operator 226 to view. The present world state 234 is also provided to the prediction engine 218 for propagation into some future time t(f) specified by the operator.

As noted above, the HMI 210 includes the world state fusion & rendering pipeline 220 which is an event driven component that receives world state updates or changes made by the state aggregator 214 to the present world state 214. It also has the responsibility of fusing the current world state with future world state generated by the prediction engine 218 and rendering the resultant fused information onto the physical display device 224 for the operator 226 to view. The graphical input tools 228 houses graphical components that take inputs from an operator 226. A notional example of an input tool is a timeline slider. This input component displays current time, which is always moving forward, and a future time, which is calculated by an offset that is determined by the operator through sliding a marker along the timeline, in one example. When the operator 226 requests a projection of the world state by method of a graphical input tool 228, the present world state 240 and the offset time are passed into the prediction engine 218 which responds with a projection of the present world state 240 and its alternatives into the specified future point in time S(t(f)) where S is the project state at future time t(f).

The prediction engine 218 includes a time manager 250 that is the master time manager for all visual components of interest. It maintains a master wall clock and a real-time clock for each platform and entity of interest. When it receives an offset time instance, it calculates a future clock instance by adding the real-time (current time) to the offset time for each platform or entity of interest. Since real time consistently moves forward, the time manager 250 has the added responsibility of determining how long the projected state is valid for. After the valid time period has expired, the time manager 250 notifies the system that the projected future world state is no longer valid and that a new projection is required.

One or more object model estimators (or predictors) 254 can be provided as a plug-in framework for creating, loading, and managing behavioral models. These models have a one to one correspondence to the data feeds coming into the state aggregator 214. Each object model estimator 254 includes methods and constraints specific to its associated data feed for projecting that particular data feed into the future. Such methods may include a family of prediction and interpolation algorithms that are appropriate for each respective object behavioral model. The prediction algorithms can include, but are not limited to, Kalman filters, Markov filters, Particle filters, Runga-Kutta, Predictor-Corrector, and so forth.

A world state propagator 256 processes an offset time, current state, and the appropriate object model estimators, and propagates them from the present state to a specified future state. This component 256 conducts this action for each object model. Upon completion of all the models, the predicted world state is aggregated at 260 and sent to the world state fusion & rendering pipeline 220 for display at 244.

Figure 3:
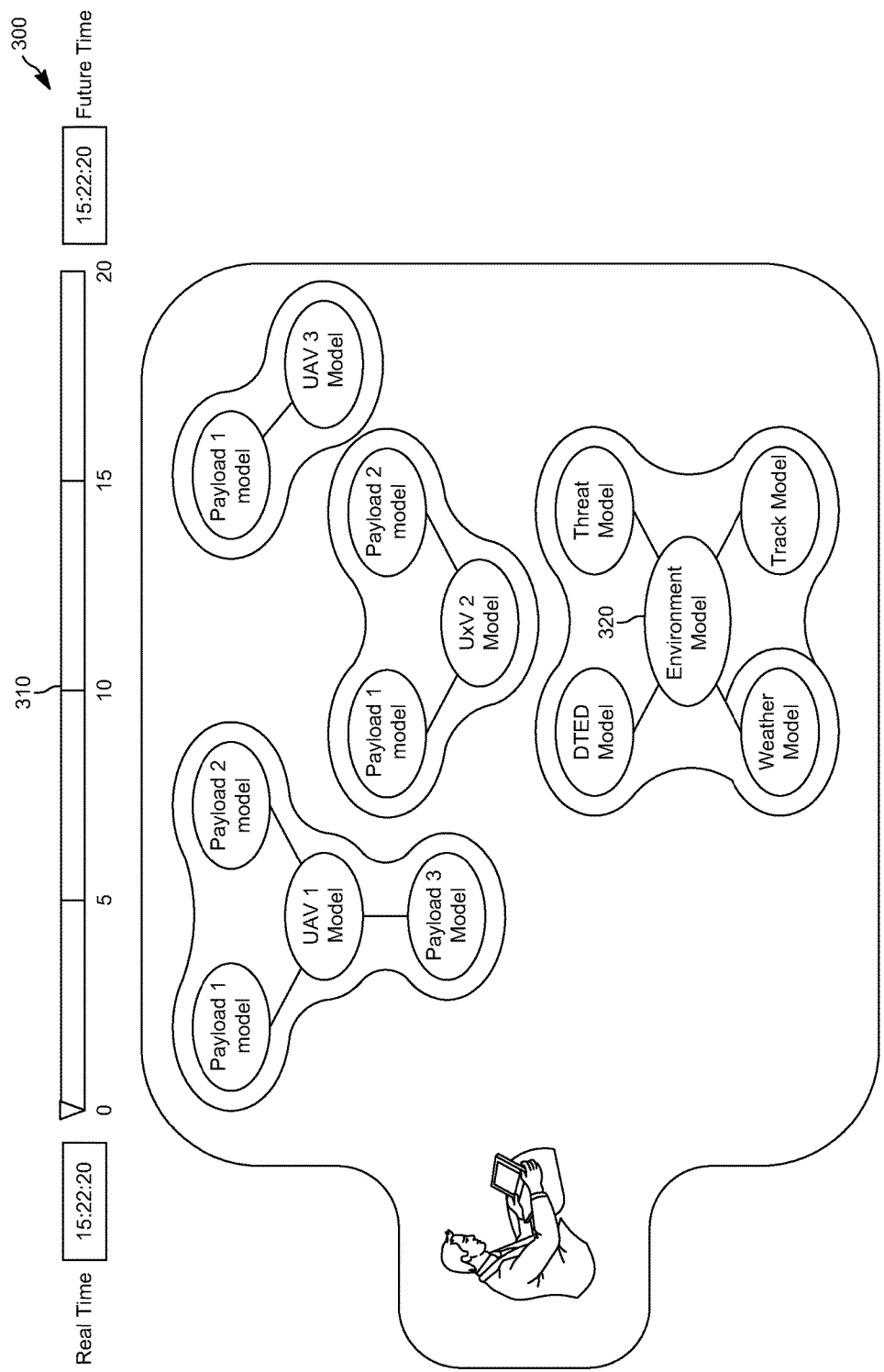
FIG. 3 illustrates an example of an interface that illustrates multiple models of control that can be viewed in current time or projected into the future based on a time specifier.

FIG. 3 illustrates an example of an interface 300 that illustrates multiple models of control that can be viewed in current time or projected into the future based on a time specifier 310. In this example, the time specifier 310 provides a graphical input slider for specifying current or future times for the visualization. In this example, current time is specified as no future offset is selected via the time specifier 310. In this example, multiple vehicles shown as UAV 1, UxV 2 (e.g., USV), and UAV 3 can be visualized with each of the respective platforms having differing payload capabilities such as the number sensor inputs or weapons systems, for example. An environmental model 320 can also be processed with such inputs as previously described such as weather model, threat model, and tracking model, for example. Output from the environmental model 320 can be employed to project capabilities of the UxV's into the future. For example, if the time specifier 310 were moved from present time (e.g., slider at 0) to 10 minutes (e.g., slider moved to the 10 minute position, visualizations for each of the platforms can be projected 10 minutes into the future in accordance with projected environmental conditions from the environment model 320. As noted above with respect to FIGS. 1 and 2, other data feeds can be aggregated, processed, and utilized to produce future visualizations for the UAV's based on the settings of the time specifier 310.

Figure 4:
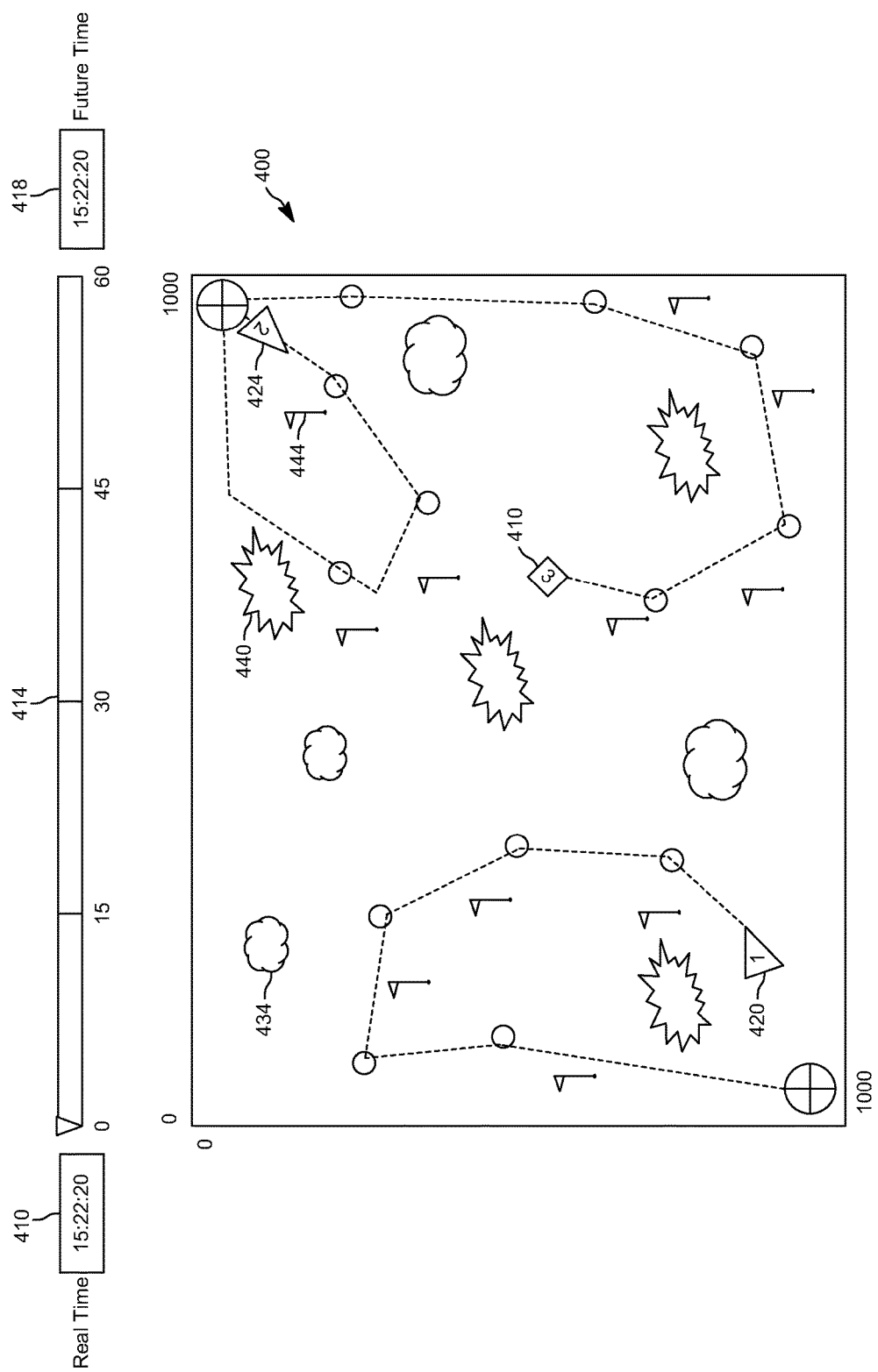
FIG. 4 illustrates an example interface output of multiple unmanned vehicle path trajectory and path environments in present time.

FIG. 4 illustrates an example interface output 400 of multiple unmanned vehicle trajectory plans and path environments in present time. At 410, a clock indicates current real time for the visualization 400. At 414, a mission time bar with sliding time indicator indicates a specific future time for visualization and analysis. At 418, a clock indicates future time that the UxV state is being visualized for analysis. At 420, a current state of UAV 1 at current real time indicated by clock 410. At 424, a current state of USV 2 at current real time indicated by clock 410. At 430, a current state of UAV 3 at current real time as indicated by clock 410. At 434, a current state of a Weather (Wx) instance at current real time indicated by clock 410. At 440, a current state of a threat instance at current real time indicated by clock 410. At 444, a current state of a target instance at current real time indicated by clock 410 is shown.

Figure 5:
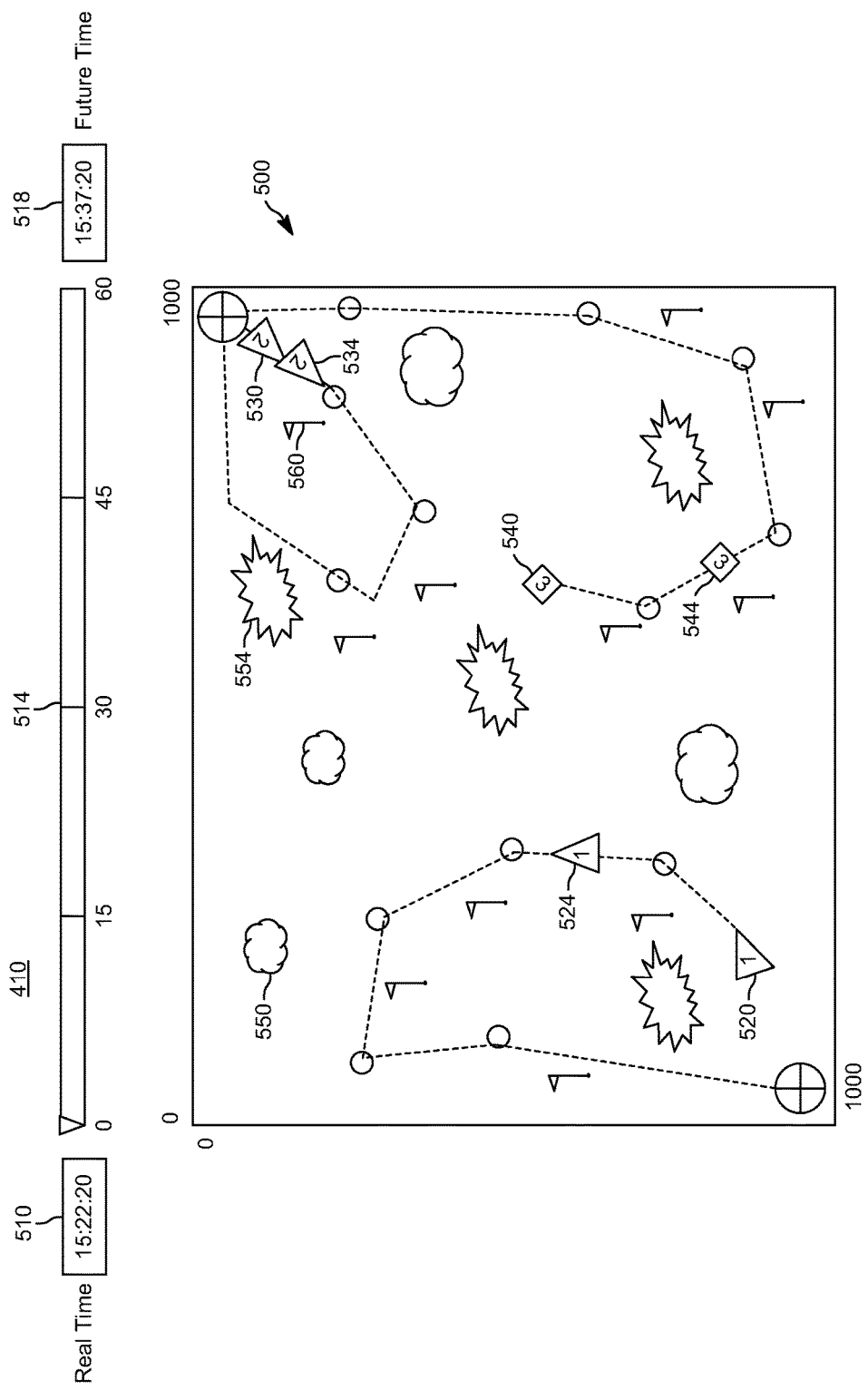
FIG. 5 illustrates an example interface output of multiple unmanned vehicle path trajectory and path environments from the interface output depicted in FIG. 4 projected in future time.

FIG. 5 illustrates an example interface output 500 of multiple unmanned vehicle path trajectories and path environments from the interface output depicted in FIG. 4 projected in future time. At 510, a clock indicates current real time. At 514, a mission time bar with sliding time indicator indicates a specific future time for visualization and analysis. In this example, 15 minutes is the requested future time specified for the visualization 500. At 518, a clock indicates future time that the UxV state is being visualized for analysis. At 520, a current state of UAV 1 at current real time indicated by clock 510. At 524, a projected state UAV 1 at future time indicated by slider 514. At 530, a current state of USV 2 at current real time indicated by clock 510 is shown and its icon color can change indicating a task has completed (e.g., icon changing from red to green). At 534, a projected state of USV 2 at future time as indicated by slider 514. At 514, a current state of UAV 3 at current real time indicated by clock 510 is shown. At 544, a projected state of UAV 3 at future time indicated by slider 514. At 550, a projected state of a Wx instance at future time indicated by slider 514. At 554, a projected state of a threat instance at future time indicated by slider 514. At 560, a projected state of target instance at future time indicated by slider 514.

Figure 6:
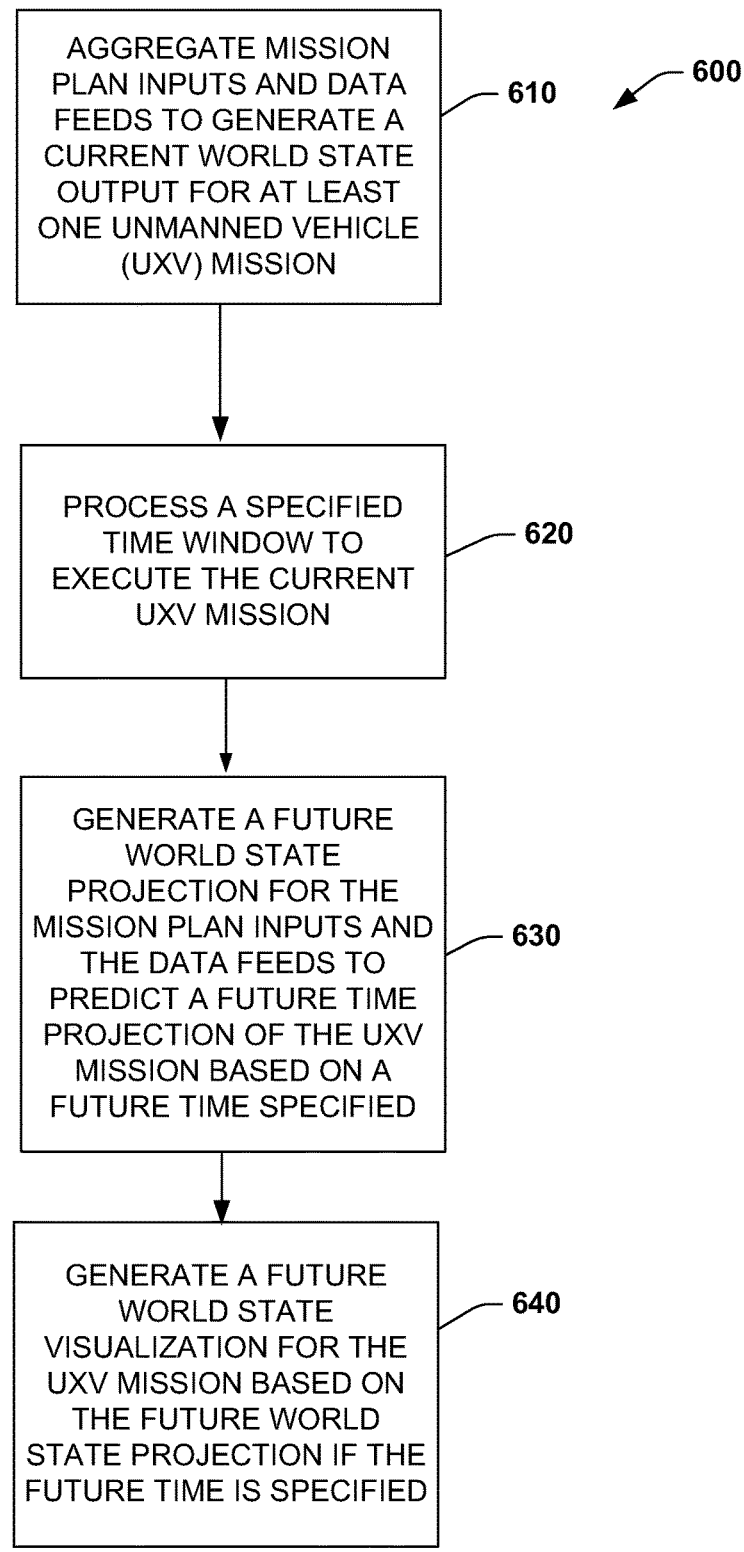
FIG. 6 illustrates an example of a method to provide spatial and temporal forecasting for predictive situation awareness of an unmanned vehicle.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 6 illustrates an example of a method 600 to provide spatial and temporal forecasting for predictive situation awareness of an unmanned vehicle. At 610, the method 600 includes aggregating mission plan inputs and data feeds to generate a current world state output for at least one unmanned vehicle (UxV) mission (e.g., via state aggregator 120 of FIG. 1). The current world state output describes the current state of the mission plan inputs and the data feeds. The mission plan inputs describes current mission destinations and tasks to be executed by the UxV and the data feeds describe current detected events that affect the current world state of the UxV mission. At 620, the method 600 includes processing a specified time window to execute the current UxV mission (e.g., via time manager 166 of FIG. 1). At 630, the method 600 includes generating a future world state projection for the mission plan inputs and the data feeds to predict a future time projection of the UxV mission based on a future time specified (e.g., via world state propagator 126 of FIG. 1). At 640, the method 600 includes generating a future world state visualization for the UxV mission based on the future world state projection if the future time is specified (e.g., via HMI 110 of FIG. 1). Although not shown, the method 600 can also include displaying a future environment to be encountered by the unmanned vehicle or displaying alternative flights paths of the unmanned vehicle.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
one or more computers executing computer executable components, the computer executable components comprising:
a state aggregator that aggregates mission plan inputs and data feeds to generate a current world state output for an unmanned vehicle (UxV) mission, the current world state output describes the current state of the mission plan inputs and the data feeds, the mission plan inputs describes current mission destinations and tasks to be executed by the UxV and the data feeds describe current detected events that affect the current world state of the UxV mission;
a time specifier to generate a command to specify a time window to execute the current UxV mission based on a user input;
a prediction engine that receives the current world state output of the UxV mission from the state aggregator and generates a future world state projection for the specified time window to predict a future time projection of the UxV mission, wherein the future world state projection is based on a prediction from at least one model of one or more future states of the data feeds received by the state aggregator; and
a human machine interface (HMI) to generate a future world state visualization of the future world state projection for the UxV mission for the specified time window.

2. The system of claim 1, wherein the time specifier comprises a time slider graphical input to specify a current time or the future time for the visualization, a voice input to specify the current time or the future time for the visualization, a hand or figure gesture to specify the current time or the future time for the visualization, or a retinal scan input to specify the current time or the future time for the visualization.

3. The system of claim 1, wherein the data feeds include at least one of a mission plan input to provide primary and contingency route information for the unmanned vehicle, a tasking input to describe actions to perform, and a weather input to provide information relating to current and future weather patterns.

4. The system of claim 3, wherein the data feeds include at least one of a threat input to provide threat information relating to external threats to the UxV, a track input to relating to the status of an entity encountered by the UxV, a sensor input to provide data collected by the UxV, and a communications input to provide information regarding the status of communications assets that are available to the unmanned vehicle.

5. The system of claim 1, wherein the at least one model includes a UxV predictor to predict future flight paths and routes of the UxV, an environment predictor to predict future environment status for the UxV, a communications predictor to predict the status of communications assets that are available in the future.

6. The system of claim 5, wherein the at least one model includes a weather predictor to predict future weather patterns to be encountered by the UxV, a tasking predictor to predict actions that can be performed in the future by the UxV, and a threat predictor to predict future threats to the UxV.

7. The system of claim 6, the at least one model includes a sensor predictor to predict the status of sensors that are available to the UxV in the future and a tracks predictor to predict the status of entities that may be encountered in the future by the UxV.

8. The system of claim 1, further comprising a world state rendering pipeline to generate the future visualization for the HMI based on the future state prediction from the prediction engine.

9. The system of claim 1, wherein the future world state visualization is variable for an alternative scenario based on a change related to at least one of the data feeds.

10. The system of claim 9, wherein the change is defined by a user input.

11. The system of claim 1, wherein the at least one model employs a heuristic algorithm to provide the future world state projection within predefined acceptable error bounds.

12. A non-transitory computer readable medium having computer executable instructions stored thereon, the computer executable instructions configured to:
aggregate mission plan inputs and data feeds to generate a current world state output for an unmanned vehicle (UxV) mission, the current world state output describes the current state of the mission plan inputs and the data feeds, the mission plan inputs describes current mission destinations and tasks to be executed by the UxV and the data feeds describe current detected events that affect the current world state of the UxV mission;
receive a user input comprising a specified time window to execute the current UxV mission;
generate a future world state projection for the UxV mission for the specified time window based on the current world state and a prediction from at least one model of one or more future states of the data feeds; and
generate a future world state visualization for the UxV mission based on the future world state projection for the specified time window.

13. The computer readable medium of claim 12, wherein the data feeds include at least one of a mission plan input to provide primary and contingency route information for the unmanned vehicle, a tasking input to describe actions to perform, and a weather input to provide information relating to current and future weather patterns.

14. The computer readable medium of claim 13, wherein the data feeds include at least one of a threat input to provide threat information relating to external threats to the UxV, a track input to relating to the status of an entity encountered by the UxV, a sensor input to provide data collected by the UxV, and a communications input to provide information regarding the status of communications assets that are available to the unmanned vehicle.

15. The computer readable medium of claim 12, wherein the at least one model includes a UxV predictor to predict future flight paths and routes of the UxV, an environment predictor to predict future environment status for the UxV, a communications predictor to predict the status of communications assets that are available in the future.

16. The computer readable medium of claim 15, wherein the at least one model includes a weather predictor to predict future weather patterns to be encountered by the UxV, a tasking predictor to predict actions that can be performed in the future by the UxV, and a threat predictor to predict future threats to the UxV.

17. The computer readable medium of claim 16, the at least one model includes a sensor predictor to predict the status of sensors that are available to the UxV in the future and a tracks predictor to predict the status of entities that may be encountered in the future by the UxV.

18. A method, comprising:
aggregating, by a system comprising a processor, mission plan inputs and data feeds to generate a current world state output for an unmanned vehicle (UxV) mission, the mission plan inputs describe current mission destinations and tasks to be executed by the UxV and the data feeds describe current detected events that affect the current world state of the UxV mission;
receiving, by the system, a specified time window to execute the current UxV mission;
generating, by the system, a future world state projection for the UxV mission for the specified time window based on the current world state output and a prediction from at least one model of one or more future states of the data feeds; and
generating, by the system, a future world state visualization for the UxV mission based on the future world state projection,
wherein the future world state visualization is displayed on a human machine interface (HMI), wherein the HMI receives a user input defining the specified time window.

19. The method of claim 18, wherein the HMI displays a time slider graphic to facilitate the user input.

20. The method of claim 18, further comprising displaying, by the HMI, the future world state visualization that includes a future environment to be encountered by the unmanned vehicle or alternative flights paths of the unmanned vehicle.

* * * * *